No. 689,348. Patented Dec. 17, 1901.
N. C. WALLENTHIN.
VEHICLE ALARM BELL.
(Application filed Dec. 24, 1900.)
(No Model.) 2 Sheets—Sheet 1.
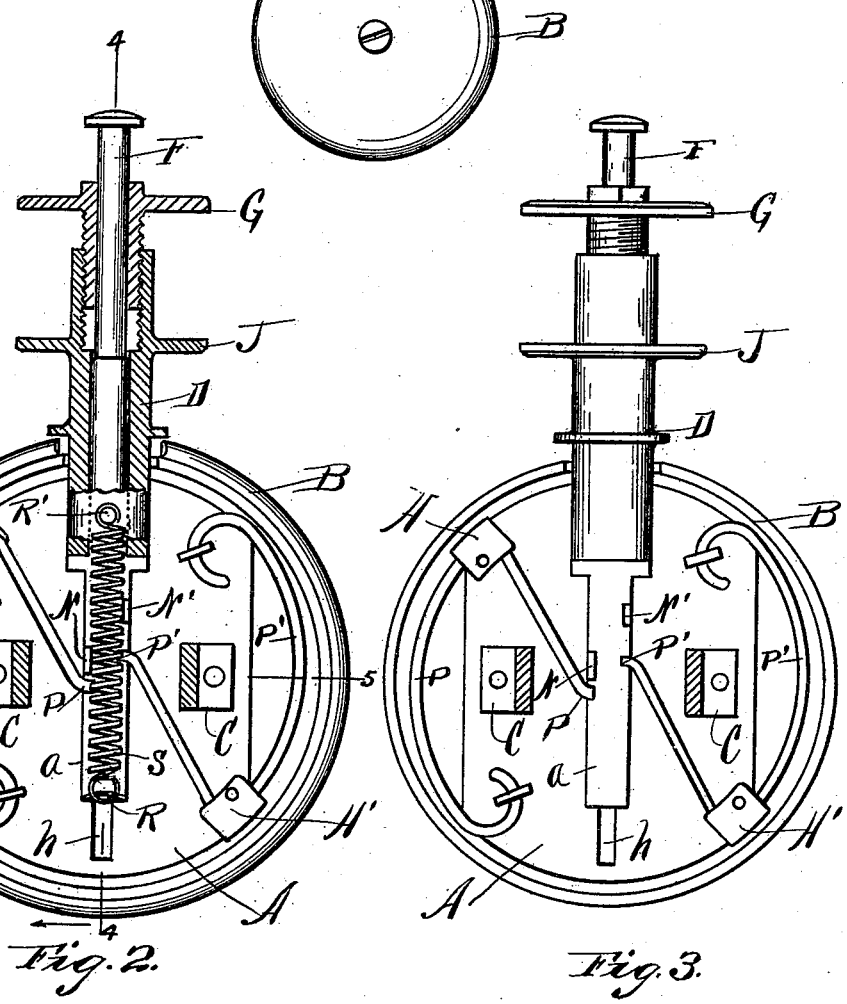

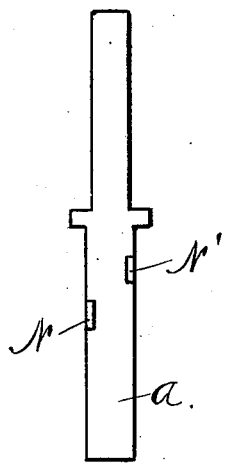
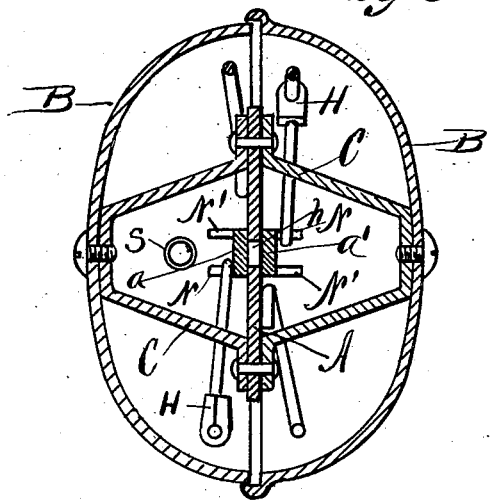
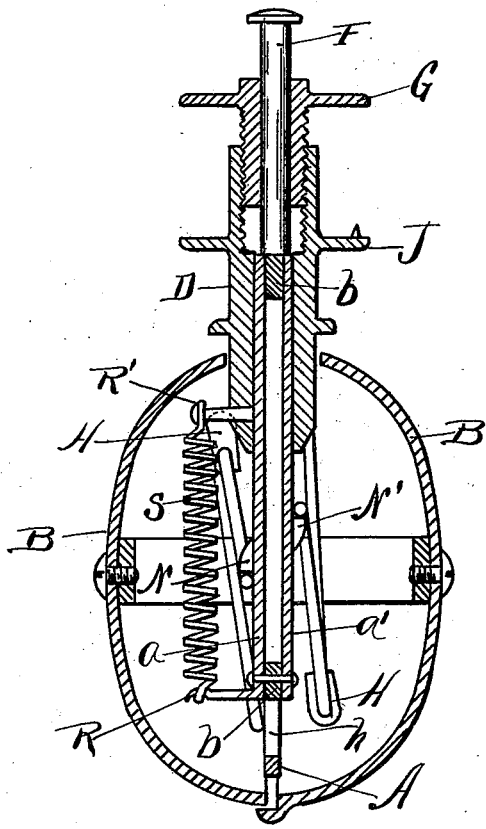

UNITED STATES PATENT OFFICE.

NILS C. WALLENTHIN, OF PROVIDENCE, RHODE ISLAND.

VEHICLE ALARM-BELL.

SPECIFICATION forming part of Letters Patent No. 689,348, dated December 17, 1901.

Application filed December 24, 1900. Serial No. 40,832. (No model.)

*To all whom it may concern:*

Be it known that I, NILS C. WALLENTHIN, a resident of the city of Providence, in the county of Providence and State of Rhode Island, have invented certain new and useful Improvements in Vehicle Alarm-Bells; and I do hereby declare that the following is a full, clear, and exact description thereof, reference being had to the accompanying drawings, and to the letters of reference marked thereon, which form a part of this specification.

This invention relates to the bells used on automobiles and other vehicles for the purpose of giving an alarm or notice of their approach, and has for its object to simplify the construction, increase their efficiency and duration, and lessen the cost of production. This is accomplished by a novelty in construction and arrangement of the parts, the details of which will be fully hereinafter set forth.

Figure 1 represents the bell attached to a portion of a vehicle. Fig. 2 represents the same with one of the bells removed to show the mechanism of that side. Fig. 3 shows the other side of the mechanism, the other bell being removed. Fig. 4 is a cross-section of both bells with the inside mechanism, taken on line 4 4 in Fig. 2 looking in direction of the arrow. Fig. 5 is a cross-section of the bells and inside mechanism, taken on line 5 5 in Fig. 2, at right angles to the section shown in Fig. 4 looking in the direction of the arrow. Fig. 6 shows the shape of the two cam-plates, which are alike.

The construction and operation are as follows:

A represents a center plate, and C C are two arched standards, secured one on each side of the plate A.

B B are two bells, secured one to the top of each standard C by means of screws or bolts.

A hollow stem D is made fast to or integral with the plate A, and two plates $a$ $a'$, the shapes of which are shown in Fig. 6, are seen in section in Fig. 4, with two blocks or washers $b$ $b$ placed between them to slide in the slot $h$ in the plate A, with the plates $a$ $a'$, carry the catches or cams N N', that operate the hammers to strike the bells. The hammers H H' are held on wire springs P P', one end of which is made fast to the center plate A, and the other end beyond the hammer-block is brought around in position to be caught by one of the catches N, when the plates $a$ $a'$ are pushed in by the pin F or on the catch N', when those plates are drawn back by the spring S, which has one end caught on a stud R' on the stem D, and the other end is attached to the end of one of plates $a$, which is bent for that purpose. (See Fig. 4.) These cam-plates $a$ $a'$ extend up into the hollow stem D to the inner end of the push-pin F, (see Fig. 4,) so that when that pin is pushed in by a pressure of the foot on its head the plates $a$ $a'$ will be forced in along the slot $h$ and the catch N will engage the end of the wire P of the left-hand hammer H, (see Fig. 2,) and in pushing by it will draw back that hammer, so that when the catch gets by and releases the wire the hammer will spring back and strike the bell. Then as the pressure of the foot is removed from the pin F the spring S will draw the plates $a$ $a'$ back again and the other catch N', which passed under the end of the wire P' when the plates $a$ $a'$ were pushed in, by reason of its inclined top, which raises the wire, (see Fig. 4,) will catch the end of the wire P' and draw it back, and when the catch N' passes the wire P' will spring back and cause the hammer H' on the right to strike the bell. At the same time of the return of the plates $a$ $a'$, when the catch N' engages the wire P', the catch N will raise the end of the wire P on its inclined top and pass under it, and the plates and wires will be back in the first position again as seen in Fig. 2.

The mechanism and other parts are exactly alike on both sides of the center plate A, excepting that there is but one spring S, and it will readily be seen that by lengthening or shortening the ends of the wires P P', so as to release them from the hook sooner or later, the bells can be made to give four distinct strokes for each depression of the pin F by the foot and its return. This gives a very effective alarm with the least amount of wear for the moving parts.

To secure the bell to the floor of a vehicle, a collar J is made fast on the hollow stem D, and a collar G is made with a hub having a screw-thread on it fitting into a screw-thread in the outer end of the hollow stem. By screwing the collar G down on the bottom of the vehicle, which is represented by the letter O in Fig. 1, with the collar J underneath, the bell will be firmly secured in place.

Having thus described my improvements, I claim as my invention and desire to secure by Letters Patent—

1. In an alarm-bell the combination of a center plate, two bells, arched standards attached to both sides of said plate to support the bells, a hollow stem attached to said plate and extending out between the bells, two hammers held on each side of said plate, a pin held to slide in the stem and operate the hammers, substantially as described.

2. In an alarm-bell the combination of a center plate, two bells, arched standards attached to both sides of said plate to support the bells, a hollow stem attached to said plate and extending out between the bells, two plates held to slide over a slot in the center plate and extend up into the hollow stem, a pin held to slide in the hollow stem and move the sliding plates, a spring connecting the hollow stem and the sliding plate, catches on the sliding plates to operate the hammers, substantially as described.

3. In an alarm-bell the combination of a center plate, two bells, arched standards attached to both sides of said center plate to support the bells, a hollow stem attached to the center plate, a collar fast on said stem, a collar with a hub screwing into the hollow stem, two hammers held on each side of said plate, with means for operating said hammers to ring the bells, substantially as described.

4. In an alarm-bell for vehicles a slotted plate with an outwardly-projecting hollow stem arranged to be rigidly secured to the vehicle, a bell or bells supported from said slotted plate, striking-hammers hung on spring-wires between their free and fixed ends, a sliding plate held on said slotted plate and having projections on it outside of said hollow stem to catch on the free ends of the hammer-wires, a spindle passing through said hollow stem to operate said sliding plate, substantially as described.

In testimony whereof I have hereunto set my hand this 21st day of December, A. D. 1900.

NILS C. WALLENTHIN.

In presence of—
BENJ. ARNOLD,
EDGAR S. MARSH.